(12) United States Patent
Terfloth et al.

(10) Patent No.: US 9,370,917 B2
(45) Date of Patent: Jun. 21, 2016

(54) JOINTING AND/OR ADHESIVE-BONDING METHOD AND PRODUCTS PRODUCED IN THIS WAY

(71) Applicant: Jowat AG, Detmold (DE)

(72) Inventors: Christian Terfloth, Detmold (DE); Dieter Guse, Lohne (DE); Felix Starck, Detmold (DE)

(73) Assignee: JOWAT AG, Detmold (DE)

( * ) Notice: Subject to any disclaimer, the term of this patent is extended or adjusted under 35 U.S.C. 154(b) by 299 days.

(21) Appl. No.: 13/864,665

(22) Filed: Apr. 17, 2013

(65) Prior Publication Data

US 2013/0302573 A1    Nov. 14, 2013

(51) Int. Cl.
*B32B 37/02*  (2006.01)
*C09J 5/02*  (2006.01)
*B32B 7/12*  (2006.01)
*C09J 7/02*  (2006.01)

(52) U.S. Cl.
CPC . *B32B 37/02* (2013.01); *B32B 7/12* (2013.01); *C09J 5/02* (2013.01); *C09J 7/0203* (2013.01); *C09J 2205/31* (2013.01); *Y10T 156/10* (2015.01); *Y10T 428/24777* (2015.01); *Y10T 428/2878* (2015.01)

(58) Field of Classification Search
CPC ........ C09J 7/0203; A47B 96/201; B32B 7/12
See application file for complete search history.

(56) References Cited

U.S. PATENT DOCUMENTS

| | | | |
|---|---|---|---|
| 6,489,392 B1 * | 12/2002 | Lappalainen et al. | 524/555 |
| 2007/0243359 A1 * | 10/2007 | Petersen et al. | 428/147 |
| 2008/0008885 A1 * | 1/2008 | Terfloth et al. | 428/411.1 |
| 2008/0190541 A1 * | 8/2008 | Terfloth et al. | 156/60 |
| 2010/0227128 A1 * | 9/2010 | Kramer et al. | 428/195.1 |
| 2011/0183122 A1 * | 7/2011 | Schumacher | 428/192 |

FOREIGN PATENT DOCUMENTS

| DE | 102008003747 A1 * | 6/2009 |
|---|---|---|
| WO | WO 9906210 A1 * | 2/1999 |

OTHER PUBLICATIONS

Translation of 102008003747 Retrieved Jun. 24, 2015.*

* cited by examiner

*Primary Examiner* — Bruce H Hess
*Assistant Examiner* — Christopher Polley
(74) *Attorney, Agent, or Firm* — Edward E. Sowers; Brannon Sowers & Cracraft PC

(57) ABSTRACT

The invention relates to a method for mounting an edge, more particularly plastics edge, onto a material, and also to the products obtained in this way, and to the use thereof.

13 Claims, No Drawings

JOINTING AND/OR ADHESIVE-BONDING METHOD AND PRODUCTS PRODUCED IN THIS WAY

CROSS-REFERENCES TO RELATED APPLICATIONS

This present application claims priority to German Applications No. DE 10 2012 007 786.6 filed Apr. 20, 2012, and DE 10 2012 008 402.1 filed Apr. 27, 2012, and incorporates all by reference herein, in their entirety.

BACKGROUND OF THE INVENTION

The present invention relates to the technical field of plastics or adhesives technology, more particularly to the adhesive bonding of edges, more particularly plastics edges, or edge bands. The present invention relates more particularly to a method for mounting edges, more particularly plastics edges, on materials, and also to the products produced in this way, and to the use thereof. The present invention further relates to a method for mounting adhesive layers, activatable by means of energy input, onto edge bands. The present invention likewise relates, moreover, to edge bands provided on at least one side with an adhesive layer which can be activated by means of energy input. Lastly, the present invention relates to the use in accordance with the invention of a composition for furnishing an edge band with an adhesive layer.

In the prior art there is a multiplicity of methods known for mounting edge bands onto the narrow faces of in particular panel-like workpieces. Typically in the prior art, edge bands are mounted onto the narrow faces of panel-like workpieces in through-travel machines, such as edging machines, for example, with the aid of edge gluing assemblies. Provision is generally made here for the narrow face of the workpiece to be furnished, immediately before the edge band is run up to it, with a hot-melt adhesive, more particularly so-called "hot-melts". The mounting of edge bands in through-travel machines with hot-melt adhesive application taking place immediately prior to the run-up of the edge band is a cost-effective method which is also suitable for the manufacture of relatively large numbers of units. Nevertheless, this method entails a host of disadvantages.

For instance, the melting of the hot-melt adhesive is energy-intensive and leads overall to an increase in the operating costs; for example, up to half an hour elapses until an operating temperature of 150 to 210° C. is attained. Furthermore, energy is needed to heat the adhesives container, in order to maintain the adhesive in the liquid or application-ready state throughout the production process. Adhesive application is typically by means of spraying, jetting, rolling or knifecoating onto the workpiece.

Furthermore, the above-described method necessitates relatively large amounts of the adhesive. As a result, the adhesive joint, after solidifying, becomes more susceptible to penetration by dirt and moisture, and consequently, over the course of time, it is on the one hand possible for the adhesive bond to part, and on the other hand the adhesive joint is often of an unsatisfactory design from the standpoint of aesthetics.

In addition, the use of the adhesive in such large quantities leads to adhesive swelling out of the bondline in the course of subsequent pressing of the edge band onto the workpiece, and this leads to instances of fouling both of the workpiece and of the processing machine. In order to prevent this, the workpiece must be treated with release agents, in a cost-intensive and inconvenient operation, before the method is commenced.

In any case, the only hot-melt adhesives that can be processed in this way are those having relatively low molecular weights and relatively high melt indices, which, however, do not lead always to the desired bonding quality.

In view of the above-outlined disadvantages of this method, a search has been on for some considerable time for alternative possibilities for mounting edge bands on narrow faces of panel-like workpieces.

Other methods of the prior art attempt to avoid these advantages through provision of edge bands which have been precoated with adhesive and which allow subsequent mounting onto the narrow face at any desired point in time following application of adhesive. With precoated edge bands, adhesive application to the edge band and gluing onto the material take place separately from one another. It is normally necessary here for the adhesive layer to be (re)activated or melted before the edge band is mounted onto the material, so that the adhesive layer is once again in the tacky or adhesive state.

The (re)activation or melting of the adhesive layer of precoated edge bands for subsequent mounting of the edge band onto a material is typically accomplished by means of plasma treatment, hot air, or irradiation with infrared, UV, laser, or microwaves. Particularly in the case of the use of laser and microwave radiation, it is generally the case here that the adhesive layer comprises additives capable of energy absorption and/or conversion, such as mineral pigments, for example. The (re)activation process or the melting of the adhesive layer, however, is associated with numerous disadvantages.

Often there is only a weakly pronounced and/or poorly controllable transfer of energy to the adhesive, so that the heating is comparatively lengthy and/or unspecific. Furthermore, in view in particular of the poor controllability of the activation process, the edge band itself is often heated as well. Such heating, however, is detrimental to the quality of the edge band, since heating of the edge band may cause material damage, resulting in turn in a restriction on edge band materials to insensitive materials. Moreover, the additives needed for energy absorption and conversion, especially mineral pigments, are often very costly, leading overall to an increase in production costs. Moreover, such additives, especially mineral pigments, may lead to a deterioration in the bonding performance, particularly if they are employed in relatively large amounts; accordingly, their proportion is kept relatively low—but this often hinders homogeneous incorporation and hence homogeneous energy transfer.

A variety of methods are known in the prior art for producing edge bands precoated with adhesive. Although such methods do lead to an improvement in relation to the disadvantages specified above, and do enable, in particular, a more flexible regime, they are nevertheless unsatisfactory in numerous respects, especially in relation to the polymers that are to be used, and to the reactivation of the adhesive layer.

In the case of the production of precoated edge bands by means of coextrusion, such bands are generally produced as part of inline processes, with a subsequently activatable plastics layer or adhesive layer—in other words, the production of the edge band on the one hand and its furnishing with plastic or adhesive, on the other, take place, so to speak, contemporaneously. Coextrusion processes offer the advantage that on account of the high temperatures they allow even the processing of polymers having a particularly high molecular weight and low melt index. Using such polymers it is possible to generate particularly stable adhesive bonds.

As well as the aforementioned general disadvantages associated with aftercoated edge bands, however, coextrusion specifically is associated, furthermore, with numerous additional disadvantages. Coextrusion processes necessitate particularly high levels of investment in relation to the production line, which must always be individually tailored to the particular process. This technology is therefore economic only for large production runs or batches. Moreover, such processes also entail numerous disadvantages from a technical standpoint. The reason is that, with coextrusion processes, the direct joining of thermoplastic edge band to plastics layer and/or adhesive layer must take place without the use of an adhesion promoter. In the absence of the adhesion promoter layer, accordingly, sufficient adhesion can be achieved only between materials of the same kind. There is also no possibility of using, for example, resin-impregnated paper edges or veneer edges as edge bands, since only thermoplastic materials are extrudable. Overall, therefore, there is only a very limited selection of materials and a limited selection of materials combinations that can be used for the production of precoated edge bands by means of coextrusion.

It is possible, furthermore, to coat edge bands with a hotmelt adhesive or hotmelt as part of offline processes. With these processes, the edge band is first of all produced per se and only later is it coated with a subsequently activatable adhesive, by a toll coater or by a manufacturer of furniture parts, for example. Such offline processes overall offer good flexibility in relation to the edge materials that are to be coated, and the inexpensive process regime means that they also allow the equipping of small batches and production runs.

As well as the problems outlined above in relation to (re) activation, however, the production of aftercoated edge bands as part of offline processes is associated with further disadvantages. A particular problem is that the use of polymers with high molecular weights and low melt indices is not possible, since the high temperatures that are needed for such polymers are unachievable in offline operation. While it is possible to coat the edge tapes much more cost-effectively as part of such offline processes, the resultant adhesive bonds are nevertheless inferior in terms of service properties to the edge bands produced by means of coextrusion, and are comparable merely with the conventional gluing of edges using thermoplastic hotmelts, as described above.

BRIEF SUMMARY OF THE INVENTION

Against this background, therefore, it is an object of the present invention to provide a method for mounting edge bands that is capable of at least largely avoiding or else at least attenuating the above-outlined disadvantages of the prior art. An object of the present invention is seen in particular as being to provide a method for the mounting of edges, more particularly plastics edges, on workpieces that allows the production of adhesive layers that are improved in relation to (re)activation.

Furthermore, a further object of the present invention is seen as being to provide a method for the mounting of edges, more particularly plastics edges, onto workpieces that possesses the flexibility of aftercoating processes (particularly in the context of offline processes) while nevertheless allowing the production of more high-grade adhesive bonds.

To solve the problem outlined above, the present invention proposes—in accordance with a first aspect of the present invention—a method for the mounting of an edge, more particularly plastics edge, on a material, according to Claim 1; further embodiments, especially advantageous embodiments, of the method of the invention are subject matter of the relevant dependent claims.

Furthermore, the present invention relates—according to a second aspect of the present invention—to a material which is obtainable by the method of the invention, in accordance with the relevant independent claims. The present invention further relates—according to a third aspect of the present invention—to the use of a material of the invention for producing furniture, in accordance with the relevant independent claim. Moreover, the present invention—according to a fourth aspect of the present invention—relates to a method for applying an adhesive layer which can be activated by means of energy input to at least one side of an edge band. Moreover, the present invention—according to a fifth aspect of the present invention—relates to an edge band or edge strip in accordance with the relevant independent claim. Lastly, the present invention—according to a sixth aspect of the present invention—relates to the use of a composition which comprises at least one adhesive polymer.

It will be appreciated that embodiments, design forms, advantages and the like which are given below, for purposes of avoiding repetition, only in relation to one aspect of the invention also apply correspondingly in relation to the other aspects of the invention.

Moreover, it will be appreciated that in the case of value, number and range indications below, the stated values and ranges should not be understood restrictively; to the skilled person it is evident that in a particular case or particular application, deviations may be made from the stated ranges and figures without departing from the scope of the present invention.

It is the case, moreover, that all of the values and parameter details or the like that are given below may be ascertained or determined in principle using standardized or explicitly specified determination methods, or else by techniques for determination that are familiar per se to the skilled person.

Subject to these preceding remarks, the present invention is described in more detail in the text below.

DETAILED DESCRIPTION OF THE INVENTION

The present invention accordingly provides—in a first aspect of the present invention—a method for mounting an edge, more particularly plastics edge, to a material, more particularly a method for mounting an edge band (edge strip) onto at least one narrow face (narrow side) of an in particular panel-like materials component (workpiece), by means of jointing and/or by means of adhesive bonding, wherein (a) first of all, the edge band, on its side to be joined to the material, more particularly materials component, is furnished and/or provided with an adhesive layer (plastics layer) which is activatable by means of energy input, the adhesive layer activatable by means of energy input being obtained starting from a dispersion or solution of at least one adhesive polymer in the absence of an energy-absorbing additive, the adhesive polymer being selected from polyvinyl acetates, and (b) thereafter, the edge band furnished and/or provided in this way with the adhesive layer which can be activated by means of energy input is mounted, with exposure to energy, onto at least one narrow face of the materials component, in particular being joined and/or adhesively bonded durably to at least one narrow face of the materials component.

In a completely surprising way, the applicant has found that through the application of adhesives based on polyvinyl acetates to edge bands, starting from dispersions or solutions, it is possible, even in the absence of energy-absorbing additives, as part of offline processes, to produce edge bands precoated with an adhesive layer which is distinguished by outstanding (re)activatability and which, after jointing or adhesive bonding, ensures extremely stable adhesive bonds to the materials component. This is surprising in so far as according to the prior art, (re)activatability exists only when additives capable of energy absorption and/or conversion, more particularly mineral pigments, are incorporated into the adhesive layer. The fact that this is not necessary in the context of the present invention, if adhesives based on polyvinyl acetates are used, is entirely surprising and could not have been predicted in this way. The present invention, then, operates without any presence of energy-absorbing additives in the adhesive layer or plastics layer.

As outlined above, the mounting of the edge, more particularly plastics edge, or of the edge band onto the material as part of the method of the invention takes place by means of jointing or adhesive bonding. Under the heading of jointing and/or adhesive bonding, the present invention understands in particular those techniques which allow the holding-together of hitherto separate workpieces (in the present case: edge or edge band on the one hand and material on the other), resulting in turn in a new workpiece with a different geometric form (in the present case: material with mounted edge or edge band). In accordance with the invention, in particular, jointing is understood to refer to fusional jointing methods, especially adhesive-bonding methods.

As also described above, in the context of the method of the invention, the edge, more particularly plastics edge, or the edge band is equipped with an adhesive layer which can be activated by means of energy input. For the purposes of the present invention, an adhesive layer which can be activated by means of energy input is a layer consisting of or comprising at least one adhesive (polymer) which can be melted and/or (re)activated by absorption of input energy, for example by laser radiation, microwave radiation, IR radiation, thermal radiation, UV radiation, plasma radiation and the like, with subsequent conversion of the absorbed energy into thermal energy. As a result of conversion of the absorbed energy into thermal energy, the adhesive layer is heated generally to temperatures above its softening or melting point or melting range, and so is placed into an adhesive or tacky state. In the context of the present invention it is possible, surprisingly, for the absorption and conversion of energy to be enabled in the adhesive layer without the use of energy-absorbing additives, more particularly without mineral pigments (e.g. without laser additives). As the studies by the applicant have shown, this is successful only if the (re)activatable adhesive used is a polyvinyl acetate. In this way, then, adhesive bonding to the material is made possible. The activating or heating operation on the adhesive layer takes place advantageously immediately before and/or during the jointing or adhesive bonding, so that adhesive layer and edge band are not exposed to disproportionate thermal stress.

The method of the invention possesses a series of advantages and features that distinguish it from the methods of the prior art. In the context of the present invention, a method is realised for the first time that allows the generation of subsequently activatable adhesive layers on the basis of polyvinyl acetates with a high molecular weight and low melt index, more particularly of adhesive layers activatable by means of laser, thermal, UV, microwave, IR or plasma radiation on edge bands, without the use of costly additives for energy absorption, more particularly without mineral pigments and the like. In spite of the renunciation of additives of the aforementioned kind, a targeted and uniform melting of the adhesive layer for subsequent adhesive bonding with the material can be achieved.

The absence of or renunciation of energy-absorbing additives, more particularly mineral pigments, has the advantage, moreover, that an improvement in adhesive bonding is achieved, since there are no disruptive additive particles that might reduce or adversely affect adhesive bonding.

It has been found to be particularly advantageous in connection with the activation and/or melting, moreover, if the dispersion or solution for applying the adhesive layer additionally comprises amphoteric molecules having hydrophobic and hydrophilic moieties. In this way the controllability and homogeneity of the heating process, especially using microwave, IR, UV, thermal, plasma or laser radiation, is improved still further, and so the uniform and full-area adhesive bonding of edge band and materials component can take place. Incomplete adhesive bonding, in contrast, would adversely affect the stability of the adhesive bond.

Furthermore, the method of the invention is cost-effective in that the cost and complexity of apparatus and adaptations to apparatus turn out to be much lower than in the case of the coextrusion methods known from the prior art. It is therefore worthwhile to use the method of the invention even in the case of relatively small production runs and batches, whereas coextrusion makes economic sense only when employed on a large scale with high numbers of units.

Moreover, the method of the invention realises the advantages of the procedurally and economically advantageous offline processes, on the one hand, and also the advantages of coextrusion processes in terms of the quality of the adhesive bonds, on the other hand, in a single process.

Furthermore, it is also possible, because of the envisaged separation of the steps of coating with the adhesive layer on the one hand and jointing method on the other hand, to make individual adaptations to edge band, material and adhesive. This is often relevant in relation to decoration and to the optical design of the end products.

Moreover, the application of the adhesive polymers based on polyvinyl acetates starting from dispersions or solutions, in particular, makes it possible, furthermore, to use particularly small quantities of adhesive and a homogeneous application (by means of jetting, spraying, knifecoating, rolling, etc, for example), and this is advantageous in a variety of respects. In this way it is possible to prevent the adhesive swelling over out of the bond line and necessitating costly and inconvenient pretreatment and/or aftertreatment of the workpiece and/or cleaning of the machine. Furthermore, as a result of the lower level of adhesive used, it is also possible to achieve relatively thin bond lines, which are also referred to as "invisible joints", being invisible to the naked eye.

The disadvantages stated above can be attributed in particular to the inventive use of polyvinyl acetates starting from dispersions or solutions as part of an aftercoating of the edge band in the absence of energy-absorbing additives, more particularly mineral pigments, in conjunction with the other measures according to the invention.

In connection with the above-described advantages and features, reference is made, even at this early point, to the working examples carried out by the applicant, which demonstrate the aforementioned effects in an impressive way and which are also described in detail below.

The present invention can be embodied in a variety of ways, with preferred embodiments being set out below comprehensively for better understanding.

Generally, when carrying out the method of the invention, the edge used, more particularly edge band, is an edge band comprising a thermoplastic or thermoset material or comprising wood or comprising paper or cardboard or comprising metals, more particularly an edge band comprising a thermoplastic or thermoset material, preferably an edge band comprising a thermoplastic material.

Materials which have been found in accordance with the invention to be especially suitable for use as the edge, more particularly edge band, are (i) polyolefins, preferably polyethylene (PE) or polypropylene (PP); (ii) polymethacrylates (PMA); (iii) polymethyl methacrylates (PMMA); (iv) polyvinyl chloride (PVC); (v) polyvinylidene halide, more particularly polyvinylidene fluoride (PVDF) or polyvinylidene chloride (PVDC); (vi) acrylonitrile/butadiene/styrene copolymer (ABS); (vii) polyamides (PA), polycarbonates (PC); (viii) melamine-formaldehyde resins; (ix) epoxy resins; (x) phenolic resins; or (xi) urea resins.

It is considered particularly advantageous here that by means of the method of the invention, more particularly on account of the application of polymer from the dispersion or solution, and also on account of the gentle activation by means of UV, thermal, IR, plasma, microwave or laser radiation, there is a much more diverse selection of the materials used for providing the edges, more particularly plastics edges, or edge bands. In the context of the present invention, and in contrast to coextrusion processes, it is also possible to use edge bands based on wood, paper or cardboard or on metals, such as aluminium, for example.

With regard to the material as such, provision is usually made, in accordance with the invention, for the material used, more particularly in the form of a panel-like materials component, to be wood, wood substitutes, plastics, or glass or metals, preferably wood or wood substitutes.

In the context of the method of the invention, the term "wood substitutes" is understood in particular to refer to wood fibre materials. Wood fibre materials are typically those materials which include wood fibres as their constituent, such as, for example, chipboard, MDF (Medium-Density-Fibreboard) or OSB (Oriented Strand-Board) panels. Also possible, though, is the use of wood substitutes based on plastics, in which case plastics contemplated include all plastics also identified in connection with the edge bands.

To prepare the surface of the edge for the adhesive or adhesive layer, more particularly for increasing the adhesion, it is preferred in accordance with the invention if the edge, more particularly the edge band, prior to furnishing with the dispersion or solution of the adhesive polymer, is provided and/or coated with an adhesion promoter (primer). Alternatively, instead, provision may also be made for the edge, more particularly plastics edge, to undergo a surface treatment and/or surface activation, preferably by means of corona treatment or plasma treatment.

The surface of the edge, more particularly plastics edge, can therefore be prepared for the adhesive by the use of two different, alternative methods (i.e. adhesion promoter application or pretreatment), more particularly for the purpose of improving the affinity of the adhesive for the edge or edge band.

As far as the adhesion promoter itself is concerned, it may be selected preferably from the group of polymer solutions or polymer dispersions, more particularly solvent-containing or preferably aqueous polymer dispersions, preferably polyurethane (PU) dispersion adhesives. In accordance with one particularly preferred embodiment, it is equally possible as adhesion promoter to use preferably aqueous polymer dispersions which are selected in particular from the group of polyurethane dispersions, acrylate dispersions, chloroprene dispersions, epoxy resin dispersions, ethylene-vinyl acetate dispersions (EVA dispersions) and polyvinyl acetate dispersions (PVAc dispersions) and also mixtures of two or more of the aforementioned dispersions. As adhesion promoter it is particularly preferred in the context of the method of the invention to use an aqueous polymer dispersion based on a polyurethane dispersion which is in particular on an aqueous basis.

As far as the dispersion or solution of the adhesive polymer that is used in method step (a) is concerned, it may take a wide variety of forms. Thus it is possible, in the context of the method of the invention, for the dispersion or solution of the adhesive polymer that is used in method step (a) for furnishing the edge, more particularly the edge band, with an adhesive layer which can be activated by means of energy input to have an aqueous basis or organic basis, preferably aqueous basis.

The application of the polyvinyl acetates, used in accordance with the invention, as adhesive polymers starting from solutions or dispersions makes it possible for the first time to produce high-quality adhesive bonds based on polyvinyl acetate, of the kind usually achieved in the prior art exclusively by means of coextrusion, and to do so also as part of aftercoating operations, especially offline processes, since such application also allows the use of polymers which can be otherwise processed only by means of coextrusion, especially polymers having high molecular weights and/or low melt indices.

According to one particularly preferred embodiment of the present invention, provision may be made for the adhesive polymer to have an average molecular weight, more particularly weight-average molecular weight (Mw), of at least 70 000 g/mol, more particularly at least 85 000 g/mol, preferably at least 100 000 g/mol. Provision may be made in particular for the adhesive polymer to have an average molecular weight, more particularly weight-average molecular weight (Mw), in the range from 70 000 g/mol to 10 000 000 g/mol, more particularly in the range from 85 000 g/mol to 5 000 000 g/mol, preferably in the range from 100 000 g/mol to 3 000 000 g/mol, more preferably in the range from 150 000 g/mol to 2 000 000 g/mol, very preferably in the range from 175 000 g/mol to 1 500 000 g/mol, especially preferably in the range from 200 000 g/mol to 1 000 000 g/mol.

In particular, in accordance with one preferred embodiment of the present invention, further provision may be made for the adhesive polymer, at a temperature of 190° C. under a load of 2.16 kg, to have a melt index (i.e. also referred to synonymously as melt flow index or melt flow rate or MFR), more particularly determined in accordance with ISO 1133, of not more than 50 g/10 min, more particularly not more than 35 g/10 min, preferably not more than 25 g/10 min. It is especially preferred in this context for the adhesive polymer, at a temperature of 190° C. under a load of 2.16 kg, to have a melt index, more particularly determined in accordance with ISO 1133, in the range from 0.01 g/10 min to 50 g/10 min, more particularly in the range from 0.1 g/10 min to 30 g/10 min, preferably in the range from 0.2 g/10 min to 25 g/10 min, more preferably in the range from 0.3 g/10 min to 20 g/10 min.

The melt index (also referred to synonymously as melt flow index or melt flow rate or MFR) serves more particularly for characterizing the flow behaviour of thermoplastics under defined pressure and temperature conditions. This parameter is used more particularly as a measure of the viscosity of the plastics melt or adhesive melt. According to ISO 1133:2005, the melt index is determined more particularly using capillary rheometers.

Through the use of adhesive polymers or polyvinyl acetates having the aforementioned molecular weights on the one hand, and/or having a melt index in the above-described range, on the other hand, it is possible to obtain particularly stable and high-grade adhesive bonds in respect of the mounting of edge bands on materials components. The processing of such polyvinyl acetates was hitherto possible exclusively as part of cost-intensive and technically complex coextrusion processes. In the aftercoating or offline processes, which are advantageous from an economic and technical standpoint, it was hitherto possible in general only to use hot-melt adhesives based on polymers with relatively low molecular weights and relatively high melt indices, which results, however, in poorer adhesive properties. The use of such polyvinyl acetates in aftercoating processes (in particular also in offline processes) as well has therefore been achieved for the first time as part of the method of the invention, more particularly by virtue of the application—realised in a completely surprising way—of the polymers starting from dispersions or solutions.

As far as the amount of adhesive polymer used is concerned, this amount may vary within wide ranges: in the context of the present invention it is preferred if the dispersion or solution used in method step (a) comprises the adhesive polymer in an amount in the range from 5 to 90 wt. %, more particularly 10 to 80 wt. %, preferably 15 to 70 wt. %, more preferably 17.5 to 65 wt. %, very preferably 20 to 60 wt. %, especially preferably 25 to 55 wt. %, based on the dispersion or solution.

In the context of the method of the invention it has surprisingly emerged, moreover, that the activation of the adhesive layer, with input of energy, can be improved if the dispersion or solution used in method step (a) comprises amphoteric molecules having hydrophobic and hydrophilic moieties, more particularly colloids, preferably protective colloids. It is particularly preferred in this context if these molecules are selected from (i) polymers containing vinyl groups, more particularly ethylene-vinyl alcohol copolymers, polyvinyl acetates, polyvinyl alcohols, polyvinylpyrrolidones and mixtures thereof; (ii) cellulose ethers, more particularly methylcellulose, hydroxyethylcellulose, hydroxypropylmethylcellulose and mixtures thereof; (iii) polyacrylates; (iv) polysaccharides, more particularly starch, alginates and mixtures thereof; (v) proteins, more particularly gelatine, and also mixtures of the aforementioned polymers. The use of ethylene-vinyl alcohol copolymers has proved particularly appropriate.

Through the use of the aforementioned amphoteric molecules it is possible still further to improve the adhesive bonding between edge band on the one hand and material on the other, in terms of the uniformity and homogeneity of that adhesive bond, not least since in this way it is possible to carry out even more targeted and precise (re)activation and/or more exact and even more effectively controllable melting of the adhesive layer. Moreover, the amphoteric molecules have the effect of stabilizing the dispersion or solution used, in particular, so to speak, in the manner of an emulsifier or dispersing assistant, but in contrast to conventional emulsifiers or dispersing assistants there is no water solubility or water sensitivity.

The amount of the amphoteric molecules used may vary within wide ranges. Provision is typically made, in the context of the present invention, for the dispersion or solution used in method step (a) to comprise the amphoteric molecules having hydrophobic and hydrophilic moieties in an amount in the range from 0.001 to 20 wt. %, more particularly in the range from 0.01 to 15 wt. %, preferably in the range from 0.1 to 10 wt. %, more preferably in the range from 0.5 to 9 wt. %, very preferably in the range from 1 to 7 wt. %, especially preferably in the range from 1.5 to 5 wt. %, based on the dispersion or solution.

In a completely surprising way, moreover, it has emerged in the context of the present invention that the adhesive layer or plastics layer produced using the method of the invention is meltable or (re)activatable even without the use of energy-absorbing, cost-intensive additives, by means of energy input (e.g. laser, UV, thermal, plasma, IR or microwave irradiation). Provision is therefore customarily made, in the context of the present invention, for the dispersion or solution used in method step (a) to contain no energy-absorbing additive, more particularly no thermal radiation-absorbing and/or no IR radiation-absorbing and/or no microwave radiation-absorbing and/or no laser radiation-absorbing and/or no plasma radiation-absorbing pigment or additive.

This is all the more surprising since in the adhesive systems of the prior art, the presence of energy-absorbing additives is absolutely necessary in order to make it possible at all to have (re)activation with irradiation of energy. The reason is that such energy-absorbing additives are capable of absorbing energy reversibly, converting it into thermal energy and releasing that energy to the surroundings, resulting in a temperature increase in the surroundings. As part of customary (re)activation processes of adhesive layers for the mounting of edge bands to materials components in accordance with the prior art, it is in this way that the adhesive layer is brought to temperatures above its softening or melting point or melting range, thereby placing the adhesive layer in an adhesive or tacky state. Energy-absorbing additives of these kinds are generally mineral pigments or additives, which are usually present in the adhesive layer. As already described above, such additives are associated with relatively high costs, making it disadvantageous to use them.

All in all, then, it was entirely surprising in the context of the method of the invention that when applying adhesive polymers based on polyvinyl acetates starting from solutions or dispersions, the energy transfer for melting the adhesive layer can be controlled effectively even without the use of such energy-absorbing additives. This is not possible with other adhesive polymers, as studies by the applicant have shown.

As far, furthermore, as the embodiment of the dispersion or solution used in method step (a) is concerned, it is preferred for it to be on an aqueous basis. In this context provision may be made in particular for the dispersion or solution used in method step (a) to have an at least substantially neutral pH, more particularly a pH in the range from 6.0 to 8.0, preferably in the range from 6.5 to 7.5. In this case it is preferred if the dispersion or solution used in method step (a) comprises at least one pH modifier.

By setting the pH to a largely neutral pH, the stability of the solution or dispersion during processing is ensured. Furthermore, however, the process regime is also simplified in this way, since the use of solutions or dispersions with a largely neutral pH is advantageous in relation both to the protection of personnel and to the wear of the machines that are used. The pH is adjusted using pH modifiers that are well known to the skilled person.

In order to provide the edge bands with adhesive layers of particularly uniform thickness, provision may further be made, in the context of the present invention, for the dispersion or solution used in method step (a) further to comprise at least one film-forming assistant and/or at least one film former. In this case it is particularly preferred for the film-forming assistant or film former to be used in amounts in the range from 0.001 to 6 wt. %, more particularly in the range from 0.01 to 5 wt. %, preferably in the range from 0.01 to 4 wt. %, more preferably in the range from 0.05 to 3.5 wt. %, very preferably in the range from 0.1 to 3 wt. %, based on the dispersion or solution. Using a film-forming assistant or film former allows comprehensive filming of the surface of the edge band with the dispersion or solution of the adhesive polymer based on polyvinyl acetates. This ensures a particularly stable and homogeneous bond, since the surface of the edge band is covered over its full area with the adhesive dispersion. Suitable film formers and film-forming assistants for use in the dispersions or solutions are known per se to the skilled person; accordingly it is possible, for example, to use commercially available film formers, such as propylene carbonate or butyl diglycol acetate.

Furthermore, provision may be made in accordance with the invention for the dispersion or solution used in method step (a) further to comprise at least one additional additive and/or at least one additional auxiliary. The additional additive or additional auxiliary may be selected more particularly from the group of dispersing assistants, emulsifiers, fillers, defoamers, dyes, colourants, yellowing inhibitors, antioxidants, stabilizers, preservatives, UV stabilizers, levelling agents, rheology modifiers, viscosity regulators, thickeners and also mixtures and combinations thereof.

The use of the aforementioned additives and auxiliaries and also, optionally, of other customary additives not expressly mentioned at this point is known per se to the skilled person. The determination of the required amounts for use is also within the customary remit of the skilled person.

The application of the dispersion or solution of the adhesive polymer takes place likewise by means of technical methods that are well known as such to the skilled person. Accordingly, it is particularly preferred in the context of the present invention if in method step (a), for obtaining a plastics layer which can be activated by means of energy input, the edge band is furnished and/or provided with the dispersion or solution of the adhesive polymer by means of coating methods, more particularly by thermal, chemical, mechanical or thermomechanical coating, preferably by knifecoating, rolling, jetting, spray application, injecting or plastifying.

Another of the features of the method of the invention is that only relatively small amounts of the adhesive polymer are needed for a stable adhesive bond.

Accordingly, provision is usually made in the context of the method of the invention for in method step (a) the dispersion or solution of the adhesive polymer to be applied at a rate of not more than 300 g/m$^2$, more particularly not more than 200 g/m$^2$, preferably not more than 150 g/m$^2$. Provision may be made more particularly for in method step (a) the dispersion or solution of the adhesive polymer to be applied at a rate in the range from 1 to 300 g/m$^2$, more particularly in the range from 5 to 200 g/m$^2$, preferably in the range from 10 to 150 g/m$^2$. As already set out above, the use of the dispersion or solution of the adhesive polymer at the aforementioned rates is associated with numerous advantages. In particular, the swelling of the adhesive polymer out of the joint is prevented in this way. Moreover, the use of small amounts of adhesive also leads to lower thicknesses on the part of the adhesive joint, thereby achieving in particular an improvement in appearance but also, furthermore, in the durability of the resulting adhesive bond. Nevertheless, the aforementioned application rates are sufficient for reliable and stable adhesive bonding.

With regard to the process regime specifically, provision may be made for method step (a) to be operated continuously, more particularly as a through-travel method, or else statically, preferably as a through-travel method.

For the purposes of the present invention, a through-travel method refers in particular to a process for machine travel. In this case the edges, more particularly plastics edges, or edge bands are transported in a continuous flow, as for example using a conveyor belt or running-belt installation, to the coating installation, where they are provided with the dispersion or solution of the adhesive polymer, and, finally, they leave the installation in a continuous flow of edge bands provided with the adhesive layer.

In contrast to this, a static process is carried out on a machining installation which in general is portable. For this purpose, the edge bands are transported individually to the machining station, where they are coated or provided with the adhesive layer, and are then transported off again individually.

In accordance with one preferred embodiment, method step (a) of the method of the invention is operated as a through-travel process, preferably in continuous operation. The rate of advance with which method step (a) of the method of the invention is carried out can vary within wide ranges in the context of the present invention. Generally speaking, method step (a) is carried out as a through-travel process with a rate of advance of at least 1 m/min, particularly at least 5 m/min, preferably at least 10 m/min, more preferably at least 15 m/min, very preferably at least 20 m/min. Provision may be made in particular for method step (a) to be carried out as a through-travel process with a rate of advance in the range from 1 to 100 m/min, more particularly in the range from 5 to 75 m/min, preferably in the range from 10 to 60 m/min, more preferably in the range from 15 to 50 m/min, very preferably in the range from 20 to 40 m/min.

Moreover, it is usual in the context of the method of the invention for in method step (a), after the edge band has been furnished with the dispersion or solution of the adhesive polymer, for the dispersion medium or solvent to be removed. The removal of the solvent or dispersion medium takes place preferably by means of drying and/or evaporation at room temperature, more particularly at 25° C., or at elevated temperatures and/or under atmospheric pressure or reduced pressure. In this way the intention in particular is to obtain a non-tacky and/or tack-free plastics layer and/or adhesive layer which is nevertheless bondable or activatable by means of energy input. In this context, the terms "non-tacky" and "tack-free" refer to a state of the adhesive layer or plastics layer which envisages that no adhesion or adhesive bonding takes place at room temperature (i.e. 25° C.) under atmospheric pressure; only after activation by means of energy input, in contrast, is it the intention that the adhesive layer or plastics layer should develop its adhesive or tacky or adhesional properties, allowing the edge band to be mounted onto the material. Advantageously there is no need for a release sheet for protecting the adhesive layer.

In comparison to the prior art, furthermore, the thicknesses of the resulting dried and solvent-free plastics layer or adhesive layer are low. Accordingly, provision is made more particularly, in the context of the present invention, for the plastics layer and/or adhesive layer which results from method step (a) and can be activated by means of energy input to have a thickness of not more than 200 μm, more particularly not more than 150 μm, preferably not more than 100 μm. In particular it is preferred in accordance with the invention if the plastics layer and/or adhesive layer that result from method step (a) and can be activated by means of energy input have a thickness in the range from 0.1 to 200 µm, more particularly in the range from 0.5 to 150 µm, preferably in the range from 1 to 100 µm.

As the above thicknesses show, the present invention ensures that the resultant product, i.e. the materials component furnished with an edge band, has only an extremely small joint. Besides the improved aesthetic aspects, an "invisible joint" of this kind is also substantially less susceptible to penetration by moisture and dirt, and hence the adhesive bond and thus also the workpieces possess a very much higher lifetime.

With regard, furthermore, to the nature of the plastics layer or adhesive layer, provision is usually made for the plastics layer and/or adhesive layer which result from method step (a) and can be activated by means of energy input to comprise, furthermore, amphoteric molecules having hydrophobic and hydrophilic moieties, as defined above, as an ingredient and/or integral constituent. In this context it is particularly preferred if the amphoteric molecules having hydrophobic and hydrophilic moieties are distributed uniformly and/or homogeneously in the plastics layer and/or adhesive layer.

Uniform or homogeneous distribution of the amphoteric molecules having hydrophobic and hydrophilic moieties means that molecules in the adhesive layer or plastics layer are distributed at regular distances from one another over the entire area of the plastics layer. In this way it is possible to generate particularly smooth and particularly thin adhesive joints in the resulting product (i.e., materials component provided with edge band), these joints being invisible to the naked eye, on account of the particularly uniform adhesion to the material that is achieved. Furthermore, by means of the uniform or homogeneous distribution of the amphoteric molecules having hydrophobic and hydrophilic moieties, the heating of the adhesive layer can be controlled in an even more targeted way, and so at least substantially it is solely the adhesive layer, but not the edge band as such, that is heated. By means of the uniform and homogeneous distribution of the amphoteric molecules it is also possible to achieve complete adhesive bonding over the entire common area of coated edge band and materials component. The uniform distribution of the amphoteric molecules results in particular from the application of the dispersion or solution, and may be reinforced even further by means, in particular, of the use of film formers.

As far as the amount of amphoteric molecules used is concerned, it is preferred in accordance with the invention for the plastics layer and/or adhesive layer to comprise the amphoteric molecules having hydrophobic and hydrophilic moieties in amounts in the range from 0.005 to 30 wt. %, more particularly in the range from 0.05 to 25 wt. %, preferably in the range from 0.1 to 20 wt. %, more preferably in the range from 0.5 to 15 wt. %, very preferably in the range from 1 to 10 wt. %, based on the plastics layer and/or adhesive layer.

In the context of the present invention, provision is usually made for the edge, more particularly the edge band, on the one hand, and the adhesive layer which can be activated by means of energy input, on the other hand, to be joined to one another durably and/or inseparably prior to the jointing operation, more particularly before mounting of the edge onto the material. This is done in the manner described above for method step (a), i.e. by application of the adhesive polymer as a dispersion or solution, with subsequent removal of dispersion medium or solvent, respectively.

As far as the further regime is concerned, it is preferred in the context of the method of the invention if in method step (b) the adhesive layer which results from method step (a) and can be activated by means of energy input is heated with exposure to energy on the edge band, and in particular is at least partly melted and/or converted into an adhesive and/or tacky state. In this context provision may be made in particular for in method step (b) the exposure to energy to bring about a heating of the adhesive layer to temperatures in the range from 50 to 400° C., more particularly 70 to 300° C., preferably 100 to 250° C.

In relation to the input of energy for activating the adhesive layer or plastics layer, it is preferred in the context of the present invention if in method step (b) the exposure to energy takes place by means of laser radiation, heat supply, plasma radiation, infrared radiation or microwave radiation, preferably by means of laser radiation.

The customary forms, known to the skilled person, of energy input are therefore suitable for the (re)activation or melting of the adhesive layer. As the above observations show, the method of the invention can be employed, as it were, universally—in other words, there is no need for individual adaptation of the machine equipment, since the customary, known methods can be used equally.

In connection with the activation of the adhesive layer or the adhesive, it is preferred in accordance with the invention if in method step (b) the exposure to laser radiation is carried out by means of a laser source.

The terms "laser" and "laser radiation" refer in the context of the present invention in particular to light amplification by stimulated emission of radiation, this amplification being achieved through a laser medium, which may take the form of a solid, semiconductor, gas or liquid. The wavelengths of laser radiation are highly variable and encompass the spectrum from microwave radiation through to X-rays. When using laser radiation as part of jointing or bonding methods, the laser radiation is generally focussed by means of a laser medium onto the surface where jointing or bonding is to take place, and this leads to a high concentration of energy in that region. The exposure of the surface of the adhesive layer to the laser produces a rapid increase in temperature, including an increase above the softening temperature or melting range of the adhesive, and so—as mentioned above—the adhesive undergoes transition into an adhesive or adhesional or bondable state. The laser source used for the purposes of the method of the invention comprises, in particular, semiconductor lasers, solid-state lasers, fibre lasers or $CO_2$ lasers, preferably solid-state lasers or semiconductor lasers, more preferably Nd:YAG lasers or diode lasers.

According to one preferred embodiment of the method of the invention, moreover, provision is customarily made for in method step (b) the exposure to laser radiation to take place by means of laser radiation having a wavelength in the range from 150 nm to 10.6 µm, more particularly 250 nm to 10.6 µm, preferably 300 nm to 10.6 µm, more preferably 500 nm to 10.6 µm.

The energy density generated by the input of energy onto the adhesive layer or plastics layer may vary within wide ranges. With particular preference, in method step (b), the exposure to energy generates an energy density in the range from 0.001 $mJ/cm^2$ to 1000 $J/cm^2$, more particularly 0.01 $mJ/cm^2$ to 500 $J/cm^2$, preferably 0.05 $mJ/cm^2$ to 100 $J/cm^2$, more preferably 0.1 $mJ/cm^2$ to 75 $J/cm^2$, very preferably 0.2 $mJ/cm^2$ to 50 $J/cm^2$.

Finally, provision is usually made in the context of the method of the invention for the mounting of the edge onto the material, more particularly the mounting of the edge band onto the narrow face of the in particular panel-like materials component, to take place by means of jointing, preferably with pressure application and/or press application, more particularly in a through-travel method.

This is a process which is known per se to the skilled person and which may take place in particular with the use of pressing or pressuring means, such as rolls, rollers and the like, for example. As described above, the method of the invention encompasses the method steps (a) and (b), set out in detail above. It is preferred in accordance with the invention if method steps (a) and (b) are carried out separately and/or (spatially) apart from one another. It is particularly preferred in this context if an offline process is used.

The regime described above—as already mentioned above—is advantageous in a multitude of respects: owing to the cost-effective production process and also the relatively low level of cost and complexity in terms of apparatus, the method of the invention makes it possible, even when using polyvinyl acetates that can typically be processed only by means of coextrusion (that is, polyvinyl acetates having high molecular weights and/or low melt indices), for production to be economical even in the case of small batches or production runs. Furthermore, the separate regime (i.e. the subsequent application of the adhesive layer or plastics layer to an edge band which has been produced beforehand, i.e. prefabricated) allows simple, individual adaptation of the materials used, which is important particularly in relation to optical qualities, in order, for example, to produce different colorations in the decorations, but is also technically relevant in terms of the quality of the adhesive bond. Furthermore, the various manufacturing stages can be performed by different enterprises specialized in the particular procedure, with the overall effect of significantly lowering the production costs, since each of the specialized enterprises is able to go on using its existing apparatus.

Alternatively, however, it is also possible for the method to be operated overall (i.e. method steps (a) and (b)) as a continuous process, more particularly as a through-travel process. This, however, is less preferred in the context of the present invention. As has emerged from the observations above, success has been achieved for the first time in the context of the present invention in providing a method for mounting an edge, more particularly a plastics edge, onto a material, that allows the provision of adhesive layers based on polyvinyl acetates on edge bands in economically advantageous offline processes, with the adhesive layers, in spite of the absence of energy-absorbing additives, especially pigments, being notable for their outstanding (re)activatability and, furthermore, with the resulting adhesive bonds to the material being extremely stable.

Realised in the context of the present invention, therefore, is a cost-effective, individually adaptable regime, more particularly in an offline process, with which, nevertheless, it is possible to achieve outstanding adhesive bonding qualities, of the kind hitherto possible, in the thermoplastic adhesives sector, only through the use of more costly and less individually adaptable coextrusion processes.

The present invention additionally provides—in accordance with a second aspect of the present invention—a material, more particularly a panel-like materials component (workpiece), wherein at least one narrow face (narrow side) of the material is provided with an edge band (edge strip) and wherein the material is obtainable by a method as described above.

The regime of the invention, indeed, is also reflected directly in the end products, in other words in the materials which have been provided on at least one of their narrow faces with the edge band. The reason is that, first, a particularly thin adhesive layer, invisible to the naked eye—that is, a so-called "invisible joint"—is produced as a joint between materials component and edge band, in the manner according to the invention. Secondly, with a cost-effective aftercoating operation, a quality of bonding is achieved which even exceeds the quality of the adhesive bonds of coated edge bands produced by means of co-extrusion. The amounts of adhesive used as well, and also the homogeneity of their distribution, as a result of the application from dispersion or solution, and the absence of any energy-absorbing additives or pigments, distinguish the products of the invention from products of the prior art.

In accordance with this aspect of the invention, the present invention relates in particular to a material, more particularly a panel-like materials component (workpiece), wherein at least one narrow face (narrow side) of the material is provided with an edge band (edge strip), wherein the edge band is applied by means of jointing and/or by means of adhesive bonding to the narrow face and is joined durably thereto, wherein the edge band, before being applied to the material, is furnished and/or provided, on its side to be joined to the material, with an adhesive layer (plastics layer) which can be activated by means of energy input, wherein the adhesive layer which can be activated by means of energy input is obtained starting from a dispersion or solution of at least one adhesive polymer in the absence of an energy-absorbing additive, wherein the adhesive polymer is selected from polyvinyl acetates, and wherein the application and joining of the edge band to the material takes place with exposure to energy and with pressure application and/or press application.

For further details concerning the materials of the invention, reference may be made to the above observations concerning the method of the invention, which apply correspondingly in relation to the materials of the invention.

Furthermore, the present invention—in accordance with a third aspect of the invention—relates to the use of a material, more particularly of a panel-like materials component (workpiece), as has been described above, for producing furniture, more particularly kitchen parts, and furnishings of any desired kind and/or in the wood and furniture industry.

For further details relating to the inventive use, reference may be made to the above observations concerning the above aspects of the invention, which apply correspondingly in relation to the inventive use.

Likewise provided by the present invention—in accordance with a fourth aspect of the invention—is a method for applying an adhesive layer (plastics layer), which can be activated by means of energy input, to at least one side of an edge band (edge strip), more particularly for purposes of subsequent mounting of the edge, more particularly plastics edge, onto a material by means of jointing and/or by means of adhesive bonding, wherein the edge band is furnished and/or provided on at least one of its two sides, more particularly its side to be joined to a material, with an adhesive layer (plastics layer) which can be activated by means of energy input, wherein the adhesive layer which can be activated by means of energy input is obtained starting from a dispersion or solution of at least one adhesive polymer in the absence of an energy-absorbing additive, wherein the adhesive polymer is selected from polyvinyl acetates.

For further details relating to the method of the invention for applying an adhesive layer which can be activated by means of energy input onto at least one side of an edge band, reference may be made to the above observations concerning the above aspects of the invention, which apply correspondingly in relation to the aforementioned method.

Further provided by the present invention—in accordance with a fifth aspect of the present invention—is an edge band (edge strip) which on at least one side has an adhesive layer (plastics layer), which can be activated by means of energy input, and is obtainable by a method as described in accordance with the fourth aspect of the invention.

Provided more particularly by the present invention in accordance with this aspect of the invention is an edge band (edge strip) which is furnished and/or provided on at least one side with an adhesive layer (plastics layer) which can be activated by means of energy input, wherein the adhesive layer which can be activated by means of energy input is obtained starting from a dispersion or solution of at least one adhesive polymer in the absence of an energy-absorbing additive, wherein the adhesive polymer is selected from polyvinyl acetates.

For further details concerning the edge bands of the invention in accordance with the fifth aspect of the invention, reference may be made to the above observations concerning the above aspects of the invention, which apply correspondingly in relation to the edge bands of the invention.

Provided moreover by the present invention—in accordance with a sixth aspect of the present invention—is the use of a composition, more particularly in the form of a dispersion or solution of at least one adhesive polymer, for equipping and/or furnishing an edge band (edge strip) with an adhesive layer (plastics layer), more particularly for purposes of mounting of the edge, more particularly plastics edge, onto a material by means of jointing and/or by means of adhesive bonding, wherein the dispersion or solution comprises at least one adhesive polymer, selected from polyvinyl acetates, and also, optionally, at least one amphoteric molecule having hydrophobic and hydrophilic moieties, more particularly a colloid, preferably protective colloid, and/or optionally at least one film-forming assistant and/or film former, and is free from energy-absorbing additives, more particularly being free from energy-absorbing pigments.

This means that the composition used in accordance with the invention, especially dispersion or solution, comprises no energy-absorbing additives, more particularly no energy-absorbing pigments, as have been described above, and is free from energy-absorbing additives and pigments.

For further details relating to the inventive use, reference may be made to the above observations concerning the above aspects of the invention, which apply correspondingly in relation to the inventive use.

Further embodiments, modifications and variations, and also advantages, of the present invention are readily apparent to and realisable by the skilled person when reading the description, without departing from the scope of the present invention.

The present invention is illustrated by the working examples which follow, but which do not restrict in any way the present invention.

WORKING EXAMPLES

Working examples of the present invention are described below, for the mounting of coated edge bands on panel-like materials. In the examples, different embodiments of the invention were compared with one another, taking account in particular of DIN 204 (September 2001), DIN 205 (June 2003) and DIN EN 14257 (September 2006).

Edge bands used for providing inventive and non-inventive embodiments were in each case edge bands 2.1 cm wide and 3.5 m long, provided accordingly with an adhesive layer and mounted, following laser activation, onto narrow faces, 1.9 cm wide, of chipboard or MDF panels. The solution or dispersion of the adhesive polymers based on polyvinyl acetates (solutions or dispersions of polyvinyl acetates with a solids content in each case of around 55% by weight) were applied to the edge bands by a form of application well known to the skilled person, using slot dies. Activation of the adhesive layer was carried out by exposure to different forms of energy. The activation process as such—irrespective of the energy form employed—is known to the skilled person and does not require any further observations. The jointing process likewise took place by means of pressure or press application methods well known to the skilled person.

In all, four different experimental series were conducted, with comparison between inventive embodiments with (i) different amounts of amphoteric molecules, (ii) different amounts of a film former, (iii) differently prepared surfaces of the edge band, and (iv) input of different forms of energy.

The quality of the adhesive bonds between workpiece and edge band was assessed by investigating the adhesion of edge band to workpiece first at room temperature (25° C.) and secondly, for analysis of the low-temperature resistance, at +5° C. Furthermore, as part of an ascending heat test, the heat resistance was investigated, at temperatures of up to 120° C. Furthermore, in a long-term heat test, an investigation took place over 4 weeks at 50° C. of the extent to which the adhesive bonds undergo changes in their properties under the sustained influence of high temperatures. Lastly, the adhesion of the adhesive bonds was investigated at room temperature after the long-term test.

The investigations of the adhesion (at room temperature, at +5° C. and after the end of the long-term heat test) were carried out by analyzing the failure mode of the adhesive bond under load. It is usual with regard to failure modes of adhesive bonds to differentiate between adhesive fracture, cohesive fracture in the adhesive, cohesive fracture in the adherend material, and boundary layer fractures.

An adhesive fracture is attributable to inadequate adhesion between adhesive layer and material, so that the adhesive separates completely from the material; adhesive fractures were not observed in any experimental series. In the case of boundary layer fractures, the fracture occurs directly at the phase boundary between adherend surface and adhesive layer; such fractures were likewise not observed in any experimental series. Cohesive fractures within the adhesive take place generally in the event of low internal strength of the adhesive, and so, after the fracture, the adherend surfaces (edge band and material) are covered with adhesive. Cohesive fractures within the material, on the other hand, result from the internal strength of the adhesive being higher than that of the material used. The adhesive bond remains at least substantially unaffected by the mechanical load. Fractures of this kind are therefore considered to be an indicator of particularly stable adhesive bonds. In all of the experimental series, cohesive fractures within the adhesive or material, and also hybrid forms thereof, occurred. The higher the proportion of the fractures within the material, the more stable, consequently, the adhesive bond as well.

Evaluation took place here in accordance with the following rating system:

| | | |
|---|---|---|
| 1-2.9: | "(very)good" | ≤100-75% material fracture |
| 3-3.9: | "satisfactory" | ≤75-50% material fracture |
| 4: | "adequate" | ≤50-25% material fracture |
| 5: | "deficient" | ≤25% material fracture |

The heat stabilities were analysed by investigating the adhesive bonds for the appearance of visible changes as a result of the severe or sustained heat exposure ("n.v.c."=no visible changes).

(i) Effect of the Amount of Protective Colloid

In the first experimental series, the effect of the amount by weight of protective colloids used, based on the dispersion or solution, on the stability of the adhesive bond was investigated. The protective colloids were ethylene-vinyl alcohol copolymers. The (re)activation of the adhesive layer was carried out using a diode laser. The associated results can be found in Table 1 below:

TABLE 1

Effect of the amount of protective colloid used on the adhesive bonds

|  | Example 1 | | Example 2 | | Example 3 | |
|---|---|---|---|---|---|---|
|  | Fractions of protective colloid [% by weight] | | | | | |
|  | 1 | 1 | 3 | 3 | 6 | 6 |
| Material | MDF | Chipboard | MDF | Chipboard | MDF | Chipboard |
| Adhesion at RT | 2.2 | 2.1 | 1.6 | 1.8 | 2.7 | 2.5 |
| Adhesion at +5° C. | 2.2 | 2.3 | 1.6 | 1.8 | 2.8 | 2.5 |
| Ascending heat test to 120° C. | n.v.c. | n.v.c. | n.v.c. | n.v.c. | n.v.c. | n.v.c. |
| Long-term heat test | n.v.c. | n.v.c. | n.v.c. | n.v.c. | n.v.c. | n.v.c. |
| Adhesion at RT after long-term heat test | 2.4 | 2.3 | 1.7 | 1.8 | 2.8 | 2.6 |

The above information shows that for all of the protective colloid concentrations tested, in the range from 1 wt. % to 6 wt. %, based in each case on the dispersion or solution, stable adhesive bonds can be produced. The best results were achieved in each case using the protective colloids in amounts by weight of 3 wt. %. When using only 1 wt. % or 6 wt. % of the protective colloid, there was a slight drop in the stability of the adhesive bond, but in all cases the overall assessment of the stability was still "good".

(ii) Effect of the Use of Film Formers

In a second experimental series, furthermore, the effect of the additional use of film formers on the adhesive bond was investigated. The dispersions or solutions of the adhesive polymer that were used in this context contain 3 wt. % of the protective colloid based on ethylene-vinyl alcohol copolymers, relative to the dispersion or solution. The film former used was propylene carbonate. The (re)activation of the adhesive layer was carried out using a diode laser.

The associated results obtained are set out in Table 2 below:

TABLE 2

Effect of the film former on the quality of the adhesive bonds

|  | Example 4 | | Example 5 | |
|---|---|---|---|---|
|  | Fractions of film former [% by weight] | | | |
|  | 0.05 | 0.05 | 2 | 2 |
| Material | MDF | Chipboard | MDF | Chipboard |
| Adhesion at RT | 1.4 | 1.5 | 1.2 | 1.3 |
| Adhesion at +5° C. | 1.5 | 1.5 | 1.3 | 1.3 |
| Ascending heat test to 120° C. | n.v.c. | n.v.c. | n.v.c. | n.v.c. |
| Long-term heat test | n.v.c. | n.v.c. | n.v.c. | n.v.c. |
| Adhesion at RT after long-term heat test | 1.5 | 1.5 | 1.3 | 1.3 |

As can be seen from the results set out in Table 2, the quality of the adhesive bonds can be improved still further through the additional use of a film former. Without here wishing to be confined to this theory, the film former produces an even more uniform distribution of the solution or dispersion on the edge band. It is also conceivable in particular—without wishing here to be confined to this theory—that the use of a film former leads to an even more uniform distribution of the protective colloids used. In this way it is possible to achieve even more uniform heating or melting of the adhesive polymer. When using both 0.05 wt. % and 2.0 wt. % of a film former, relative to the solution or dispersion, outstanding qualities were achieved on the part of the adhesive bonds.

(iii) Effect of the Surface Pretreatment

In a third experimental series, moreover, the effect of the preparation of the surface on the adhesive layer in respect of the production of stable adhesive bonds was investigated. For this comparative test, untreated edge bands, edge bands treated by means of corona treatment, and edge bands coated with an adhesion promoter (primer) were used. The dispersions or solutions of the adhesive polymer that were used in this context contain 3 wt. % of the protective colloid based on ethylene-vinyl alcohol copolymers, relative to the dispersion or solution. The (re)activation of the adhesive layer was carried out using a diode laser.

The associated results obtained can be found in Table 3 below:

TABLE 3

Effect of the surface pretreatment on the adhesive bond

|  | Example 6 | | Example 7 | | Example 8 | |
|---|---|---|---|---|---|---|
|  | Surface preparation | | | | | |
|  | No pretreatment | | Corona treatment | | Adhesion promoter (primer) | |
| Material | MDF | Chipboard | MDF | Chipboard | MDF | Chipboard |
| Adhesion at RT | 1.8 | 1.9 | 1.4 | 1.5 | 1.3 | 1.5 |
| Adhesion at +5° C. | 1.9 | 1.9 | 1.5 | 1.5 | 1.3 | 1.5 |
| Ascending heat test to 120° C. | n.v.c. | n.v.c. | n.v.c. | n.v.c. | n.v.c. | n.v.c. |
| Long-term heat test | n.v.c. | n.v.c. | n.v.c. | n.v.c. | n.v.c. | n.v.c. |
| Adhesion at RT after long-term heat test | 1.8 | 2.0 | 1.4 | 1.5 | 1.4 | 1.5 |

While outstanding adhesive bonds can be produced even without surface preparation, the quality and adhesion of edge band and adhesive layer and, consequently, the quality of the adhesive bond as well can nevertheless be further enhanced by pretreatment. In this case, both when using corona treatment and when coating with an adhesion promoter, outstanding figures are obtained for the stability of the adhesive bonds.

(iv) Effect of the Form of Energy on the Adhesive Bond

In a final experimental series, the adhesive layers were (re)activated, to melting, by means of different, customary forms of energy familiar to the skilled person as such. The dispersions or solutions of the adhesive polymer that are used in this context contain 3 wt. % of the protective colloid based on ethylene-vinyl alcohol copolymers, relative to the dispersion or solution. The results obtained in this context can be found in Table 4 below.

TABLE 4

Effect of the form of energy on the adhesive bond

| | Example 9 | | Example 10 | | Example 11 | |
|---|---|---|---|---|---|---|
| | \multicolumn{6}{c}{Form of energy} | | | | | |
| | Laser radiation | | Plasma radiation | | Infrared radiation | |
| Material | MDF | Chipboard | MDF | Chipboard | MDF | Chipboard |
| Adhesion at RT | 1.4 | 1.5 | 1.7 | 1.7 | 1.8 | 1.7 |
| Adhesion at +5° C. | 1.4 | 1.6 | 1.9 | 1.8 | 2.0 | 1.8 |
| Ascending heat test to 120° C. | n.v.c. | n.v.c. | n.v.c. | n.v.c. | n.v.c. | n.v.c. |
| Long-term heat test | n.v.c. | n.v.c. | n.v.c. | n.v.c. | n.v.c. | n.v.c. |
| Adhesion at RT after long-term heat test | 1.5 | 1.5 | 2.0 | 1.8 | 2.0 | 1.8 |

With all three of the forms of energy tested it is possible to produce stable adhesive bonds. The best results, however, are achieved using laser radiation for the energy input. The observations above show that in the context of the present invention success has been achieved for the first time in providing an aftercoating method for edge bands that allows the production of subsequently (re)activatable adhesive layers, more particularly adhesive layers which are (re)activatable by means of laser radiation, even without the presence of an additive that reversibly absorbs energy, more particularly a pigment, being necessary, with the resulting adhesive bonds being distinguished, furthermore, by their outstanding stability as well.

The invention claimed is:

1. A method for mounting an edge band onto at least one narrow side of a workpiece in the form of a panel by means of adhesive bonding, wherein
   (a) first, the edge band, on its side to be joined to the workpiece, is provided with an adhesive layer which is activatable by means of energy input, wherein the adhesive layer activatable by means of energy input is obtained starting from a dispersion or solution of at least one adhesive polymer in the absence of an energy-absorbing additive, wherein the adhesive polymer is selected from polyvinyl acetates,
   wherein the dispersion or solution of the adhesive polymer, which is used in method step (a) for providing the edge band with an adhesive layer which is activatable by means of energy input, is formed on an aqueous basis or an organic basis; and
   wherein the adhesive polymer has a weight-average molecular weight Mw in the range from 75,000 g/mol to 10,000,000 g/mol,
   wherein the adhesive polymer has a melt index at a temperature of 190° C. AND under a load of 2.16 kg, in accordance with ISO 1133, in the range from 0.01 g/10 min to 50 g/10 min, and
   wherein the dispersion or solution used in method step (a) comprises amphoteric molecules having hydrophobic and hydrophilic moieties in the form of colloids, wherein the molecules are selected from (i) polymers containing vinyl groups, ethylene-vinyl alcohol copolymers, polyvinyl acetates, polyvinyl alcohols, polyvinylpyrrolidones and mixtures thereof; (ii) cellulose ethers, methylcellulose, hydroxyethylcellulose, hydroxypropylmethylcellulose and mixtures thereof; (iii) polyacrylates; (iv) polysaccharides, starch, alginates and mixtures thereof; (v) proteins and gelatine, and also mixtures of the aforementioned polymers, wherein the dispersion or solution used in method step (a) comprises the amphoteric molecules having hydrophobic and hydrophilic moieties in an amount in the range from 0.001 to 20 wt. %, based on the dispersion or solution; and
   (b) thereafter, the edge band thus provided with the adhesive layer which can be activated by means of energy input is mounted, with exposure to energy, onto at least one narrow side of the workpiece, while being adhesively bonded durably to the at least one narrow side of the workpiece.

2. The method according to claim 1,
   wherein the edge band comprises a thermoplastic or thermoset material selected from the group consisting of (i) polyolefins; (ii) polymethacrylates (PMA); (iii) polymethyl methacrylates (PMMA); (iv) polyvinyl chloride (PVC); (v) polyvinylidene halides; (vi) acrylonitrile/butadiene/styrene copolymers (ABS); (vii) polyamides (PA); (viii) polycarbonates (PC); (ix) melamine-formaldehyde resins; (x) epoxy resins; (xi) phenolic resins; and (xii) urea resins; and
   wherein the workpiece is made of wood, wood substitutes, plastics, metals or glass.

3. The method according to claim 1,
   wherein the edge band, prior to furnishing with the dispersion or solution of the adhesive polymer, is provided with an adhesion promoter or is subjected to a surface-activation.

4. The method according to claim 1,
   wherein the dispersion or solution used in method step (a) comprises the adhesive polymer in an amount in the range from 5 to 90 wt. %, based on the dispersion or solution.

5. The method according to claim 1,
   wherein the dispersion or solution used in method step (a) does not contain at all any energy absorbing additive or pigment.

6. The method according to claim 1,
   wherein the dispersion or solution used in method step (a) is formed on an aqueous basis; and
   wherein the dispersion or solution used in method step (a) is used at an at least substantially neutral pH in the range from 6.0 to 8.0.

7. The method according to claim 1,
   wherein the dispersion or solution used in method step (a) further comprises at least one film-forming agent in an amount in the range from 0.001 to 6 wt. %, based on the dispersion or solution; and
   wherein the dispersion or solution used in method step (a) further comprises at least one other additive selected from dispersing assistants, emulsifiers, fillers, defoamers, dyes, colourants, yellowing inhibitors, antioxidants, stabilizers, preservatives, UV stabilizers, levelling agents, rheology modifiers, viscosity regulators, thickeners and also mixtures and combinations thereof.

8. The method according to claim 1,
   wherein in method step (a), to obtain an adhesive layer which can be activated by means of energy input, the edge band is provided with the dispersion or solution of the adhesive polymer by coating methods; and
   wherein in method step (a) the dispersion or solution of the adhesive polymer is applied at a rate in the range from 1 to 300 g/m².

9. The method according to claim 1,
   wherein in method step (a), after the edge band has been provided with the dispersion or solution of the adhesive polymer, the dispersion medium or solvent is removed at room temperature, in order to give a non-tacky or tack-free adhesive layer which can be adhesively bonded by means of energy input; and wherein the adhesive layer resulting from method step (a) and activatable by means of energy input has a thickness in the range from 0.1 to 200 µm.

10. The method according to claim 1,
wherein the adhesive layer resulting from method step (a) and activatable by means of energy input comprises amphoteric molecules having hydrophobic and hydrophilic moieties, which amphoteric molecules are distributed homogeneously in the adhesive layer, wherein the adhesive layer comprises the amphoteric molecules in an amount in the range from 0.005 to 30 wt. %, based on the edge band and/or adhesive layer.

11. The method according to claim 1,
wherein the edge band and the adhesive layer which can be activated by means of energy input are joined durably and inseparably to one another before the jointing operation; and wherein in method step (b) the adhesive layer resulting from method step (a) and activatable by means of energy input is heated on the edge band with exposure to energy, in order to be at least partly converted into a tacky state; and wherein in method step (b) the exposure to energy brings about heating of the adhesive layer to temperatures in the range from 50 to 400° C.

12. The method according to claim 1,
wherein in method step (b) the exposure to energy takes place by means of laser radiation, supply of heat, plasma radiation, infrared radiation or microwave radiation; and wherein in method step (b) the exposure to energy generates an energy density in the range from 0.001 mJ/cm$^2$ to 1000 J/cm$^2$.

13. The method according to claim 1,
wherein the mounting of the edge band onto the narrow side of the workpiece takes place by means of jointing with pressure and/or press application.

\* \* \* \* \*